United States Patent
Tom

(10) Patent No.: US 9,665,344 B2
(45) Date of Patent: May 30, 2017

(54) MULTI-MODAL INPUT SYSTEM FOR A VOICE-BASED MENU AND CONTENT NAVIGATION SERVICE

(75) Inventor: Alfred C. Tom, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1337 days.

(21) Appl. No.: 12/712,130

(22) Filed: Feb. 24, 2010

(65) Prior Publication Data

US 2011/0205149 A1 Aug. 25, 2011

(51) Int. Cl.
*G06F 3/01* (2006.01)
*G06F 3/16* (2006.01)
*G06Q 30/02* (2012.01)

(52) U.S. Cl.
CPC ......... *G06F 3/167* (2013.01); *G06Q 30/0255* (2013.01)

(58) Field of Classification Search
CPC ............................ G06Q 30/0255; G06F 3/167
USPC ........ 345/156, 184, 169, 173, 174; 715/716, 715/225; 178/18.03, 18.01; 704/9, 260, 704/E15.043, E15.003
See application file for complete search history.

(56) References Cited

U.S. PATENT DOCUMENTS

| | | | |
|---|---|---|---|
| 6,033,224 A * | 3/2000 | Kurzweil et al. | 434/112 |
| 7,483,834 B2 * | 1/2009 | Naimpally et al. | 704/270.1 |
| 2003/0105639 A1 * | 6/2003 | Naimpally et al. | 704/276 |
| 2006/0031073 A1 | 2/2006 | Anglin | |
| 2007/0073543 A1 | 3/2007 | Hammler | |
| 2007/0168115 A1 * | 7/2007 | Ikehara et al. | 701/200 |
| 2008/0120330 A1 * | 5/2008 | Reed et al. | 707/102 |
| 2008/0141180 A1 * | 6/2008 | Reed et al. | 715/854 |
| 2008/0205601 A1 | 8/2008 | Lavoie | |
| 2009/0112582 A1 * | 4/2009 | Kuwagaki et al. | 704/225 |
| 2009/0150791 A1 | 6/2009 | Garcia | |
| 2010/0169075 A1 * | 7/2010 | Raffa et al. | 704/9 |
| 2010/0292990 A1 | 11/2010 | Lee | |

FOREIGN PATENT DOCUMENTS

| | | |
|---|---|---|
| DE | 100 58 228 A1 | 5/2002 |
| DE | 10 2004 061 806 A1 | 7/2006 |
| DE | 10 2006 062 028 A1 | 7/2008 |
| EP | 2 051 241 A1 | 4/2009 |

OTHER PUBLICATIONS

Jaka Sodnik, Christina Dicke, Saso Tomazic, Mark Billinghurst, "A user study of auditory versus visual interfaces for use while driving", International Journal of Human-Computer Studies 66, pp. 318-332, 2008.

* cited by examiner

*Primary Examiner* — Olga Merkoulova
(74) *Attorney, Agent, or Firm* — John A. Miller; Miller IP Group, PLC

(57) ABSTRACT

A system and method for providing voice prompts that identify task selections from a list of task selections in a vehicle, where the user employs an input device, such as a scroll wheel, to activate a particular task and where the speed of the voice prompt increases and decreases depending on how fast the user rotates the scroll wheel.

17 Claims, 1 Drawing Sheet

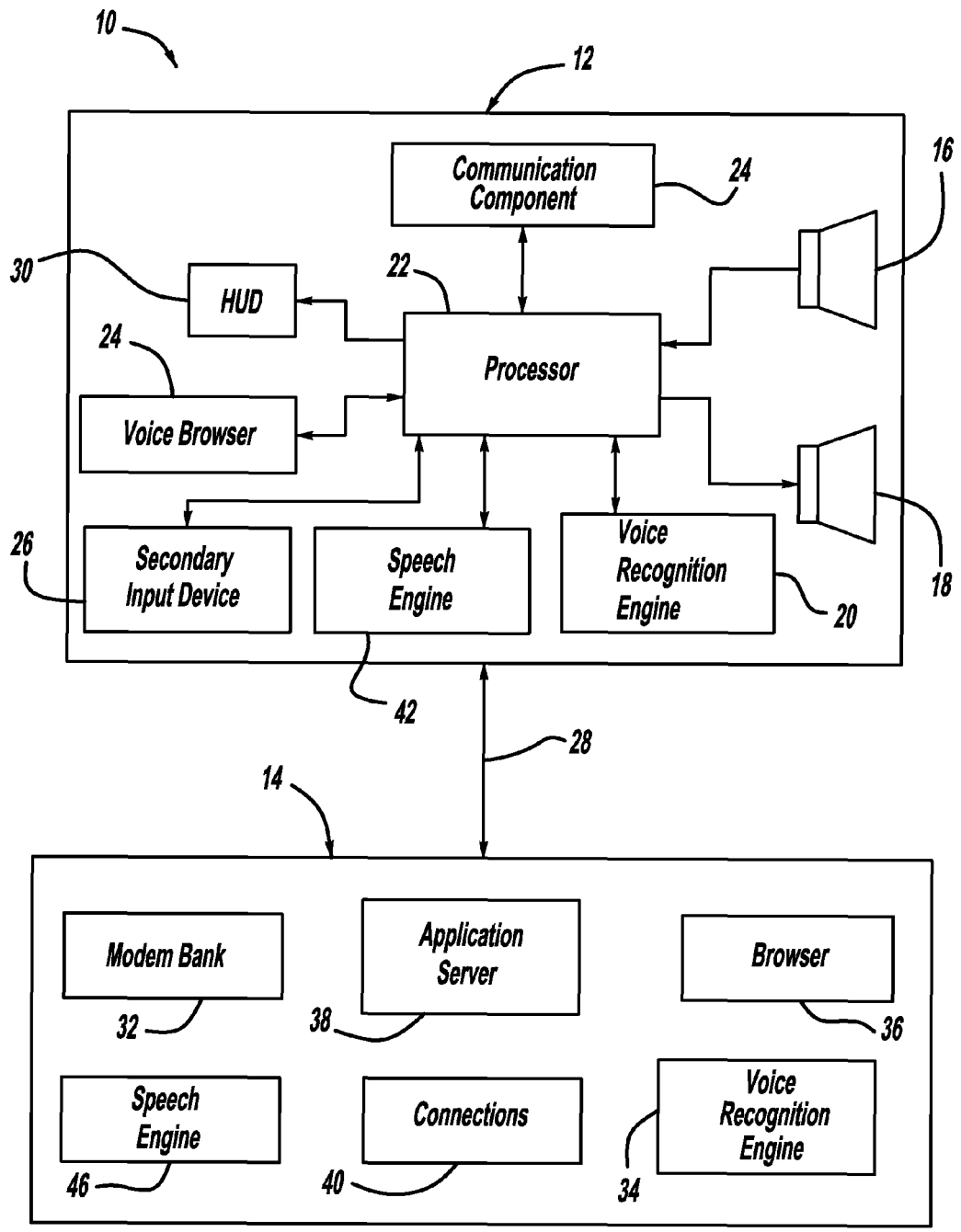

MULTI-MODAL INPUT SYSTEM FOR A VOICE-BASED MENU AND CONTENT NAVIGATION SERVICE

BACKGROUND OF THE INVENTION

1. Field of the Invention

This invention relates generally to a system and method for providing voice prompted task selection and, more particularly, to a system and method for providing voice prompted task selection for a user in a vehicle, where the user operates an input device, such as a scroll wheel, and a voice response identifies each selectable task from a list of tasks as the scroll wheel is rotated, and where the speed of the voice response increases and decreases depending on how fast the scroll wheel is rotated.

2. Discussion of the Related Art

Modern vehicles often include many and various systems that provide vehicle occupant conveniences, such as cellular telephone, internet access, digital music files, turn-by-turn navigation, Wi-Fi, etc. These systems can sometimes be accessed by a single human-machine interface (HMI) to allow the user to more easily select and control the various systems.

Studies have shown that 70-80% of all vehicle trips are driver only. Thus, the driver is the single most important occupant of a vehicle from an HMI stand-point. A vehicle HMI typically needs to be different than other HMIs because the vehicle driver cannot be significantly distracted at normal driving speeds, particularly, a driver cannot take his/her eyes off the road and hands of the steering wheel except for short periods of time. Typically, the distraction threshold for vehicle based systems is that the system cannot be any more distracting to the driver than the vehicle radio. This precludes using HMI devices that employ screen-based user-interfaces. Thus, HMIs that may be used when the vehicle is stationary, such as a screen-based internet browser, are nearly irrelevant for drivers during operation of the vehicle.

Speech recognition systems have been employed in vehicles to address the driver distraction issue, where the system audibly prompts the driver and the driver responds to questions to identify tasks the driver wants performed. A useful HMI for drivers is one that enables the driver to effectively access and obtain information at normal driving speeds. Voice/speech HMIs have been popular because they allow drivers to access information and control functionality without the distraction of screen-based interfaces. Speech recognition itself works well if the potential responses can be limited to a few possible choices, but dictation-type recognition or many choices is very unreliable, especially if there is limited context, such as entering short phrases into a search box. However, a noisy cabin environment and background, especially at high vehicle speeds, being slower to navigate than screen-based user interfaces, not being able to convey as much information, etc. may prevent the efficient use of a speech recognition systems because the user may have to repeat various commands, such as a telephone number.

One HMI associated with speech recognition systems that has been used in the industry is a scroll wheel that allows the vehicle operator to scroll through a menu of tasks that are available on the vehicle, such as call, dial, turn-by-turn, navigation search, virtual advisor, etc, associated with various systems, such as cellular telephone, navigation systems, internet, etc. A voice prompt identifies each task as the user scrolls through the list for tasks using the scroll wheel. The user can select the task at a particular prompt by either pushing the scroll wheel or pushing a separate button.

If a user is familiar with a particular task selection system and knows that he wants to select a task towards the end of the task list, then he can rotate the scroll wheel faster to skip many of the tasks before he gets to the one he wants to choose. In the current systems, as the scroll wheel is rotated faster, the voice prompts get cut off because the user has scrolled to the next selection before the voice prompt is able to identify the current selection.

Once a user selects an upper level selection, then that selection may have other selections that need to be chosen, which could be significant. For example, if one of the selections is MP3 player, then once that selection is made, the user may be required to select a song from the MP3 player song list, which may be one of many songs.

There are many different types of voice-driving services on the market. For example, dialing 411 gives the user an automated system that collects information and then passes this information to a live operator. Dialing 777-Film is completely automated, and sends the user through a many-tiered menu navigation system controlled by keypad DTMF signals and voice recognition. These services require a voice-enabled connection to a network server, such as a VoIP or circuit switched connection. Some of these systems use VoiceXML, SALT and other industry standards to describe the menu design. However, apart from speech recognition, DTMF is the only method for sending data in these systems.

SUMMARY OF THE INVENTION

In accordance with the teachings of the present invention, a system and method are disclosed for providing voice prompts that identify task selections from a list of task selections in a vehicle, where the user employs an input device, such as a scroll wheel, to activate a particular task and where the speed of the voice prompt increases and decreases depending on how fast the user rotates the scroll wheel.

Additional features of the present invention will become apparent from the following description and appended claims, taken in conjunction with the accompanying drawings.

BRIEF DESCRIPTION OF THE DRAWING

FIG. 1 is a schematic block diagram of a system for providing voice prompted task selection on a vehicle.

DETAILED DESCRIPTION OF THE EMBODIMENTS

The following discussion of the embodiments of the invention directed to a system and method for increasing and decreasing the speed of a voice prompt in response to the input speed of an input device is merely exemplary in nature, and is in no way intended to limit the invention or its applications or uses. For example, the system and method of the invention have particular application for vehicle HMI devices. However, as will be appreciated by those skilled in the art, the system and method will have other applications.

The present invention proposes a multi-modal audio-based HMI for vehicle drivers. Although described mostly from an automotive environment, the present invention can also be applied to any environment or application where the user cannot look at a screen for too long of a time, such as walking on the sidewalk of a busy city, riding a bike, etc., and can be used in other terminals, such as headsets. The multi-modal audio-based HMI can control any suitable vehicle system for the purposes described herein, such as a cellular telephone, a digital song player, such as an MP3 player, an internet browser, a vehicle navigation system, etc.

The present invention can be divided into two major components, namely a terminal that includes the components that reside on the vehicle and a network that includes the components that reside on the service provider system.

FIG. 1 is a schematic block diagram of a system 10 for providing voice prompted task selection on a vehicle. The system 10 may include a terminal 12 of the type referred to above that resides on the vehicle and a network 14. A data communications channel 28 connects the terminal 12 and the network 14. The terminal 12 may include a microphone 16, a speaker 18, a voice recognition engine 20, a speech engine 42, which could be a text-to-speech engine, an audio file player, or both, a processor 22, a communications component 24 for voice and data and a secondary input device 26. The secondary input device 26 is generally a tactile device, such as touch-pad, scroll wheel, button or keypad, but can also include gesture or bio controls. The terminal 12 can also include a voice browser 24 and a head-up display (HUD) 30 or a display screen with or without touch input. The network 14 may include a modem bank 32, a voice recognition engine 34, a browser 36, an application server system 38, connections 40 to third party servers, and a speech engine 46, which could be a text-to-speech engine, an audio file player, or both. Although not specifically shown, each element in the network 14 may be coupled to a common communications bus so that the various elements can talk to each other. Table 1 below shows a menu list of possible command items, such as command item 1: "Radio," command item 2: "Climate," and command item 3: "Auxiliary." Table 2 below shows examples of software commands for the command items.

TABLE 1

Menu List

Command item 1: "Radio"
Command item 2: "Climate"
Command item 3: "Auxiliary"

TABLE 2

```
<menu id="mainmenu">
    <prompt>
        Which of the following commands do you want?
    </prompt>
    <choice next="coupons.vxml" short= "coupons">
        <audio src="coupons.wav" short="coupons_s.wav">
            Daily Coupons
        </audio>
    </choice>
    <choice next="radio.vxml" short="radio">
        <audio src="radio.wav" short="radio_s.wav">
            Radio Control
        </audio>
    </choice>
    <choice next="climate.vxml" short="climate">
        <audio src="climate.wav" short="climate_s.wav">
            Climate Control
        </audio>
    </choice>
    <choice next="aux.vxml" short="aux">
        <audio src="aux.wav" short="aux_s.wav">
            Auxiliary Input Device Control
```

TABLE 2-continued

```
        </audio>
    </choice>
        <imgad src="chevy.jpg" />
</menu>
```

A voice interaction session can be initiated by either the terminal 12, the network 14, or the user. The terminal 12 may initiate a session by prompting the user with a question. The user can then respond via speech or the input device 26. The network 14 initiates a session by communicating with the terminal 12 requesting that the terminal 12 prompt the user. The user may initiate a session by activating the input device 26, such as a button, a touch pad, or a scroll wheel. The terminal 12 may recite a prebuilt list of possible commands for the user to choose from (e.g., menu items such as "Radio", "Climate" and "Auxiliary") or it can ask the user an open-ended question and process the response using natural language speech recognition and/or a speech recognition grammar.

If the terminal 12 wants to give the user a choice from a limited set of commands, the terminal 12 may communicate the possible commands as a menu list. The user can wait to hear all of the items on the menu list and then make a selection, or the user can use the secondary input device 26 to quickly move forwards or backwards through the menu items and choose the desired command item. The secondary input device 26 may be a scroll wheel, touch-pad, dial, up/down or left/right buttons, or any other input device suitable for the purposes described herein. The user may speak the command desired or use the secondary input device 26 to make a selection. For example, the user may press a button when the desired menu item is being recited. The selection method may be a button, a tap on a touch sensor, or a keystroke on a keypad.

If the input device 26 is activated when a menu item from Table 1 is being recited to the user, the corresponding command from Table 2 is chosen, once an item is chosen. The terminal 12 may pause between menu items to give the user a chance to choose the command after hearing the whole command recited. Alternatively, the recitation of the menu list may be completely determined by the activation of the input device 26. If the user activates the device 26 the terminal 12 recites the next command in the menu list. If the user does not activate the device 26, the terminal 12 either does nothing or keeps reciting the current command the user has navigated to. Although this technique of reciting menu items is entirely based on the device 26, where activation gives the user ultimate control, it may not work well with lay users since lay users may not realize they must activate the device 26 to go to the next menu item. It may be best to resume the recitation of the whole list at some point even though there is no device activation. Once an item is chosen, the terminal 12 may recite the chosen item and ask the user for confirmation. The user can use the secondary input device 26 to reject the item, such as press a cancel button, or confirm the item, such as select an input button. In this way, the user can quickly navigate and make a selection using a voice-based command menu system.

Scrolling through the menu items can be done in a many ways. One may use the input device 26, such as buttons, a scroll wheel, or other mechanism, to interrupt the current menu item being recited and go forward to the next item, or back to the previous item. This allows the user to get through the item list quickly. However, such techniques cut off the current item being recited, which generally forces the user to listen to almost the whole item name before the user can determine whether to click the next item. Alternatively, the input device 26 can be used to increase the speed at which the terminal 12 recites the menu items just like speeding up a vinyl record on a turntable. The speech can be processed using well-known techniques to avoid any changes in voice pitch (without which voice can sound like a chipmunk's if played too fast). The terminal 12 may also recite an abbreviated description of the command for faster navigation. The command list may have two or more descriptions for each menu item-one for fast navigation and one for slow navigation. For backwards play, instead of reciting the words backwards which is unintelligible, the terminal 12 can recite each item in the reverse order at a quicker speed. For example, if the forward direction of the command list is "Radio, Climate, Auxiliary", the backwards play would instead recite "Auxiliary, Climate, Radio". The terminal 12 may have the ability to monitor the speed the user chooses, determine which speed the user is most comfortable with, and make the speed the default one to use when reciting future menu choices. The terminal 12 may use pre-recorded audio clips for reciting menu items, and have several audio clip versions on hand depending on the speed the user desires for reciting the menu items. Alternately, the terminal 12 may use a single audio clip and process it faster or slower, or the terminal 12 may use a TTS engine to create the audio from the text. The TTS engine may also input the speech faster or slower depending on how fast the user is manipulating the input device 26

The browser 24, sometimes called an interpreter, includes the software that controls the menu navigation. The browser 24 may read a file, such as a VoiceXML file or any other tagged file, that tells the browser 24 the menu items to recite to the user. The browser 24 may have functionality that allows the user to confirm or reject selections using a speech response or the input device 26. For example, when the user hears the recited list of command choices, the user can say the command desired, and the browser 24 will use speech recognition to determine the command the user spoke and execute the command. If the browser 24 is on the terminal 12, the terminal 12 may download files from the network server 38 over the data communication link 28. The files can then be interpreted by the browser 24 and the menu options can be recited to the user. Or, the file can be already stored locally on the terminal 12 so no download from the network server 38 is necessary. The file consists of text that will be recited to the user as well as markup language tags that tell the browser 24 how to interpret the text. Some tags will delineate the various items in a command menu (e.g.—item 1, item 2, etc.) Other tags will tell the browser 24 how to present or recite the text. For example, variable speed voice prompts can be encoded in special tags and interpreted by the browser 24. These tags can be used to indicate whether to use TTS on a text string to recite a menu item or use an audio file. The tags can also delineate which audio files should be used for fast activation of the input device 26 (e.g.—fast scrolling) and which should be used for slow activation. If the device 26 is being activated fast the browser 24 will know to use the shorter audio file.

If the browser 36 resides on the network 14, the terminal 12 makes a voice call to the modem bank 32. The modem bank 32 hands the session off to the browser 36, which reads the files from the application server 38. The browser 36 then recites menu items and responds to the terminal 12 over the voice link through the modem bank 32. The terminal 12 can use in-band data communication to communicate over the voice link the secondary inputs. This in-band communication can be tone-based, such as DTMF, modulated data similar to the system used by Airbiquity, or a voice/data transfer mode as exists in the GSM system. The network 14 may be able to recognize the speech from the terminal 12 using its own recognition engine and decode the in-band data from the terminal 12 at the same time. Input data can also be communicated between the terminal 12 and the network 14 using out-of-band methods, such as a separate packet data connection that the network 14 recognizes as belonging to terminal 12 it already has a voice session with, but using in-band data is preferable in some cases because it doesn't require separate data connection. The secondary inputs can be used to change the speed at which the command list is being recited over the voice connection, or recite the menu items backwards. The secondary inputs can be also used to select a menu item, similar to the operation of the terminal 12 described above.

If the browser 24 resides on the terminal 12, the terminal 12 can augment the HMI using a visual screen, such as the HUD 30 and/or console screen. The terminal 12 can recite the menu items and display the items on the visual screen 30 at the same time. The user can use a touch-screen to respond by selecting screen menu items. The user can also respond with the secondary input device or with a voice response.

The technique of using secondary input signals for moving backwards and forwards through audio menus can also be applied to navigation long voice passages, such as audio books or TTS rendering of a text-based eBook. This allows the user to easily skip sections or "re-listen" to sections. The technique can also be used to navigate through a list for confirming what the user said. For example, if the user says "telephone", the speech recognizer might think the user said either "telephone" or "deli phone". The terminal 12 can tell the user "did you say telephone or deli phone . . . ". The user can use the secondary input device 26 to navigate though the options and select the option he meant. Similarly, the speech recognition system can automatically put up a list of choices it thinks the user said, and the user can navigate through the choices by voice or by secondary input. For example, if the user says "order coffee from Starbucks" the voice recognition system can then reply "do you want to 1) order tea from Starbucks, 2) order coffee from Starbucks, or 3) order coffee from Seattle's Best?" Then the user can choose which option he wants.

Inserting ads into a voice stream isn't as easy as it is with screen-based search. With screen users can choose to ignore ads on a side column. They cannot ignore ads inserted into an audio stream, unless they have the ability to fast forward. One technique is to place the ads in the optional screen while the voice stream is playing. The file used by the terminal 12 to recite the audio can have special advertisement tags, see "imgad" tag in Table 2) that set apart text, images and other elements in the file as being part of a visual ad that should be displayed only on the screen or HUD 30. Or the audio stream representing the reciting of a command list can contain a short prompt that says "this service is brought to you by McDonald's". The terminal 12 may allow the user to select the audio or visual ad to get more information. The advertisement may also show up as an additional menu item that the user can select if they choose (see Daily Coupons in Table 2). The exact placement of the ad in the list of items may be variable, and the actual content of the ad can be chosen using an advanced ad placement engine that takes into account various statistics such as the context of the commands, the preferences of the user, the location of the user, the target profile of the ad, user habits, ad revenue from the ad, etc.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A voice-based menu navigation system comprising:
a speech engine operable to recite a list of choices to a user for the user to choose from;
an input device that is operated by the user and is operable to increase or decrease the speed of the recitation of the list of choices in response to operation by the user, wherein the recitation of the list of choices becomes an abbreviated description for faster navigation; and
a component that is operable to track the manipulation speed of the input device provided by the user and set a default rate of speed based on a user's tracking history.

2. The system according to claim 1 wherein the speech engine is a text-to-speech engine that recites the list of choices from text data.

3. The system according to claim 2 wherein the text-to-speech engine chooses which text to process and recite to the user based on the user's manipulation of the input device if there are two or more text descriptions for each choice in the list of choices.

4. The system according to claim 1 wherein the speech engine is an audio file player, said list of choices being based on audio files provided by the audio file player, wherein manipulation of the input device changes the speed of the playback of the audio file player.

5. The system according to claim 4 wherein there are two or more audio files for each choice in the list of choices, and wherein the speech engine chooses which audio file to recite to the user based on the user's manipulation of the input device.

6. The system according to claim 1 wherein the speech engine is operable to recite the list of choices in forward or reverse order and with varying speed, wherein the list of choices is recited at a speed in reverse order that is faster than a preceding forward speed.

7. The system according to claim 1 wherein the speech engine determines a command the user speaks and recites a list of commands the user may have intended, and wherein the user uses the input device to select the desired command.

8. The system according to claim 1 wherein the speech engine determines the list of choices to be recited based on the content of a text file with markup tags where the markup tags describe which content applies to which speed of recitation of the list of choices.

9. The system according to claim 8 wherein the markup tags differentiate between audio files that are used for slow recitation and audio files that are used for fast recitation.

10. The system according to claim 8 wherein the markup tags differentiate between text descriptions that are used for slow recitation and text descriptions that are used for fast recitation.

11. The system according to claim 8 wherein the markup tags tell the speech engine whether to use text descriptions or audio files for recitation of the list of choices.

12. The system according to claim 1 wherein the list of choices includes advertisements.

13. The system according to claim 12 wherein the input device is operable to allow the user to select an advertisement to get more information about the advertisement.

14. A voice based menu navigation system comprising a terminal component and a network component where the terminal component connects to the network component through a voice channel and a data channel and the network component is operable to recite a list of choices to a user over the voice channel that allows the user to choose a choice through a voice response from the terminal component over the voice channel or through data signals sent from an input device on the terminal component to the network component, wherein the terminal component is operable to track the manipulation speed of the input device provided by the user and set a default rate of speed based on a user's tracking history.

15. The system according to claim 14 wherein the input device is operable to allow the user to control the speed of recitation of the list of choices.

16. The system according to claim 14 wherein the input device is operable to cause a speech engine to recite the list of choices both forwards and backwards.

17. The system according to claim 14 wherein the input device is operable to allow the user to change the order of the list of choices.

* * * * *